March 11, 1969 L. MASLOW 3,431,584
CASTER BRAKE ASSEMBLY

Filed March 17, 1967 Sheet 1 of 3

INVENTOR.
LOUIS MASLOW
BY
Friedman & Goodman
ATTORNEYS

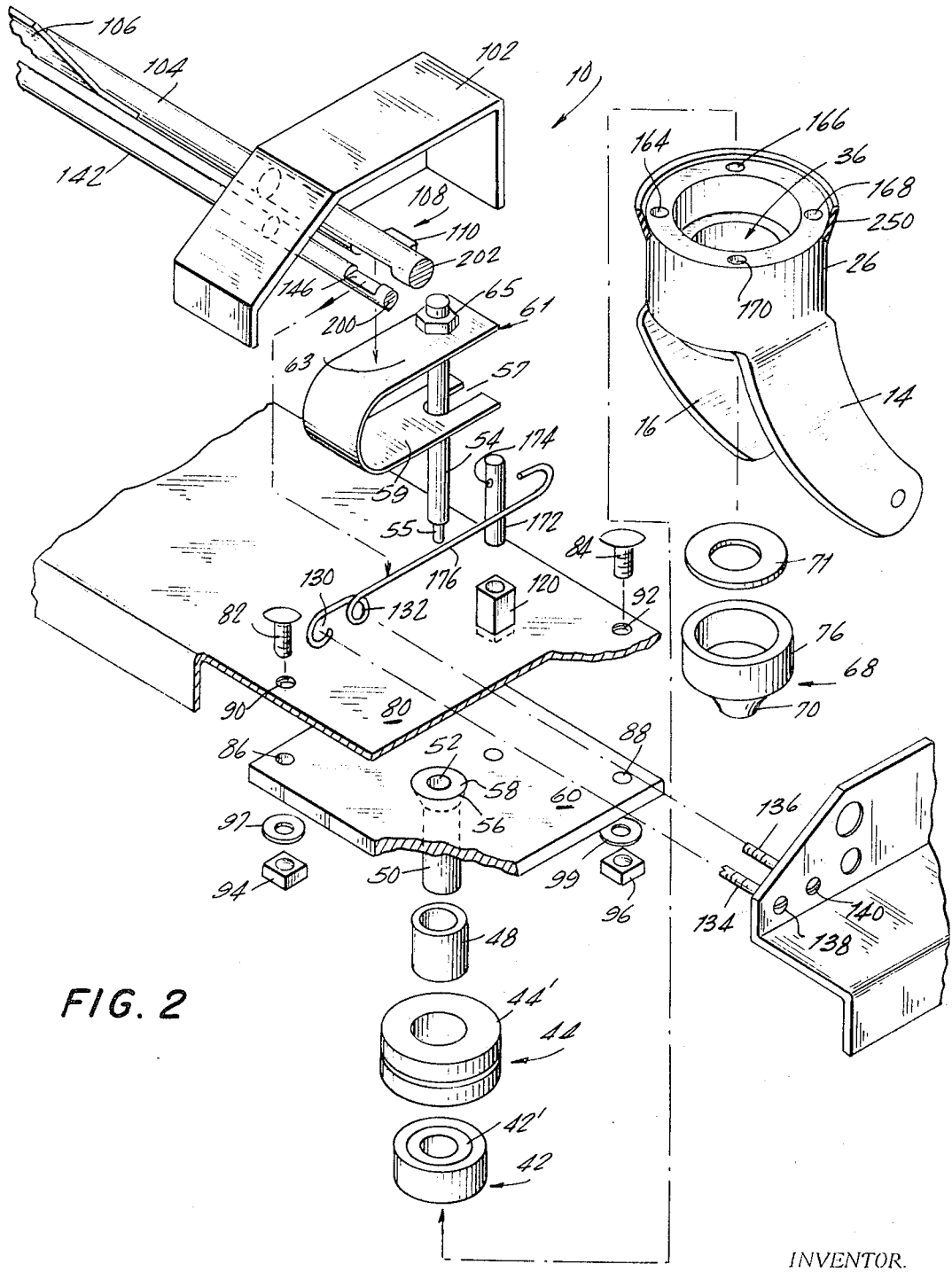

March 11, 1969  L. MASLOW  3,431,584
CASTER BRAKE ASSEMBLY
Filed March 17, 1967  Sheet 3 of 3
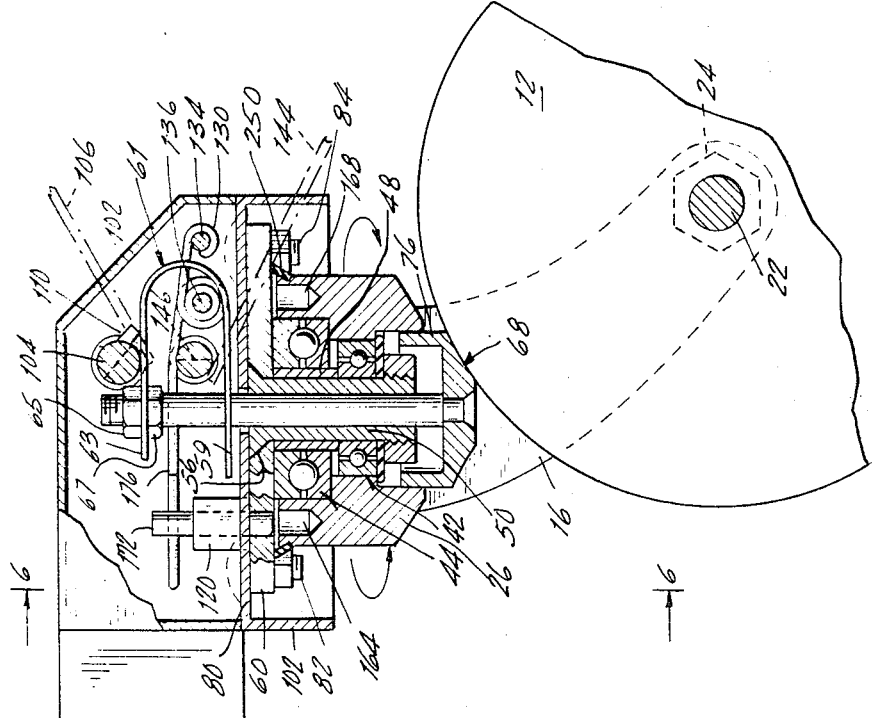
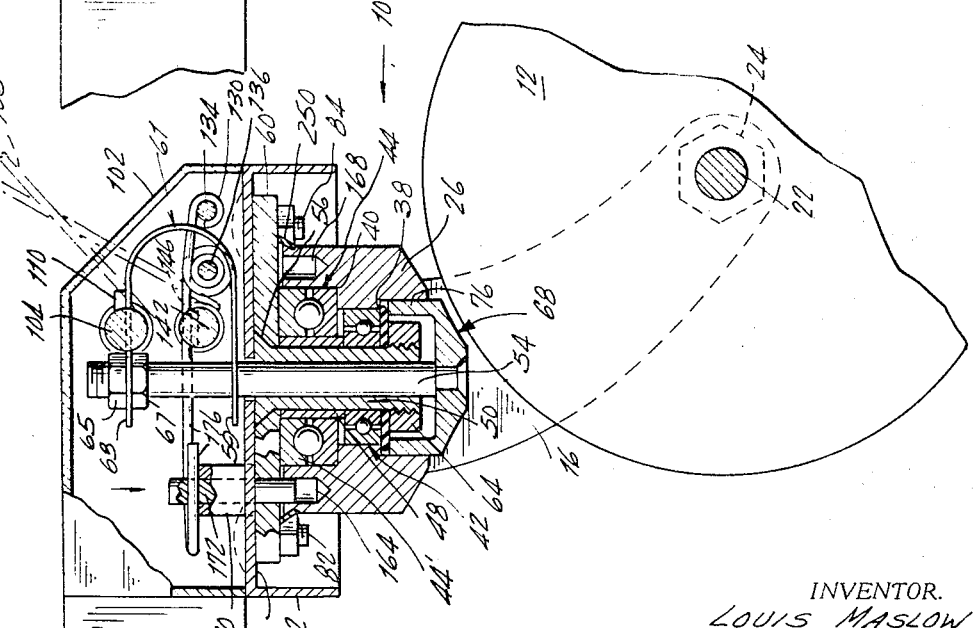
INVENTOR.
LOUIS MASLOW
BY
ATTORNEYS

United States Patent Office 3,431,584
Patented Mar. 11, 1969

3,431,584
CASTER BRAKE ASSEMBLY
Louis Maslow, Huntsville Road, Dallas, Pa. 18612
Continuation-in-part of application Ser. No. 611,650,
Jan. 25, 1967. This application Mar. 17, 1967, Ser.
No. 624,099
U.S. Cl. 16—35  9 Claims
Int. Cl. B60b 33/06

ABSTRACT OF THE DISCLOSURE

This invention and this disclosure are directed to a new and unique caster assembly. More particularly, this invention and this disclosure are directed to a caster assembly and brakes thereon which serve to brake the caster in two ways, i.e. restrain swivel action and preclude wheel revolution. This disclosure further relates to a mechanism which facilitates the braking actions which is responsive to actuating means located remote from the caster wheel itself and which actuates a spring type mechanism whereby the swivel brake and/or the forward movement brake arrests swivel or forward movement. The caster assembly and particularly the brake mechanism do not entail the protusion or projection of parts radially outward from the caster wheel which represent a hazard in schools, hospitals and other institutions where casters are often employed as a means for facilitating the movement of carts, furniture and the like. The caster assembly of my invention is characterized by permitting removal of the caster wheel without dislodging or removing the caster brake mechanism and other mechanisms in their entirety. Another feature of the invention and this disclosure resides in a brake means for the caster assembly which does not depend upon a specific wheel alignment or position for its operation. Another features resides in a swivel brake. The inventions reside in the employment of resilient spring means which are actuated by a rod having a partial recess or the like to which a lever is affixed. The respective braking means are responsive to the spring means.

*Relationship to prior applications*

This application is a continuation-in-part of my co-pending applications Ser. No. 611,650, filed Jan. 25, 1967, entitled "Caster Assembly."

BACKGROUND OF THE INVENTION

*Field of the invention*

This invention resides in the caster assembly field and, more particularly, the caster assembly field characterized by a brake mechanism and a swivel brake. Such a mechanism is operable in the case of the instant invention, independently of the brake mechanism restraining revolution of a caster wheel about the caster wheel axis. This invention is specifically directed to a new and improved spring actuating means which can be readily assembled from the inexpensive and conveniently available materials.

*Discussion of the prior art*

As discussed in my copending application, caster assemblies are generally and broadly well known. My copending application discloses and claims a unique caster assembly provided with either or both of the braking means discussed above, i.e. swivel brake and forward movement brake. These brakes are actuated by means located remote from the caster wheel itself and the brakes themselves do not protrude from the apparatus. In that application an assembly for actuating the brakes is disclosed which assembly embodies a coil spring and a pair of cam type mechanisms which act in combination with the coil spring and related parts. Since assembly time and materials always add to the cost of the caster assembly it became desirable to provide an inexpensive, relatively simple, easily assembled actuating means for the brakes.

SUMMARY OF THE INVENTION

*Objects of the invention*

It is an object of this invention, therefore, to provide a caster assembly provided with either or both of the desired brakes, i.e. swivel brake and forward movement brake.

It is still another object of this invention, therefore, to provide such a caster assembly provided with inexpensive, easily constructable, actuating means for the brakes.

These and other objects of my invention will become apparent from the following complete description, appended drawings and claims.

*Statement of the invention*

This invention contemplates an improvement in a caster assembly provided with a caster wheel brake means operable by a caster wheel brake actuating means located remote from the caster wheel, the improvement comprising a generally U-shaped resilient leaf spring means, the legs of said generally U-shaped means running in a generally horizontal direction, the lowermost leg bearing against a stationary member and the uppermost leg in engagement with a cam mechanism, said generally U-shaped resilient spring means affixed to said caster wheel brake means and operable in combination with said cam mechanism to engage said brake means on a caster wheel.

In another phase of my invention, I contemplate an improvement in a caster assembly provided with a laterally rotatable means provided with a caster wheel rotatable therewith, said caster wheel rotatable vertically with respect to said laterally rotatable means, said laterally rotatable means provided with a plurality of vertical holes about its periphery adaptable to receive a lateral rotation braking pin, a horizontal stationary plate provided with a downwardly extending column about which said laterally rotatable means is rotatable, said horizontal stationary plate provided with at least one hole which when in registry with one of said vertical holes permits passage of said braking pin therethrough and into said vertical hole, thereby locking said laterally rotatable means to said horizontal stationary plate, the improvement which comprises a resilient laterally extending wire one end of which is in engagement with the upper end of said pin and the other end of which is rigidly affixed to said caster assembly, said wire in engagement with a cam mechanism operable to raise and lower said wire thereby raising and lowering said pin.

This invention contemplates the leaf spring means and the resilient wire actuating means in one caster assembly having both a forward movement brake means and a swivel brake. In a particularly preferred embodiment, the resilient wire has a U-shaped configuration with the legs of the U in the same lateral plane.

*Brief description of the drawings*

The invention can be more readily understood and appreciated by reference to the accompanying drawings, in which:

FIGURE 2 is an exploded view of the caster brake assembly and the swivel brake. The caster wheel is not shown in the figure;

FIGURE 4 is a sectional elevation taken along the line 4—4 of FIGURE 3;

FIGURE 5 is a sectional elevation similar to FIGURE 4 showing the swivel brake in non-braking position and the forward movement brake in braking position;

Description of the preferred embodiment

Figure 6:
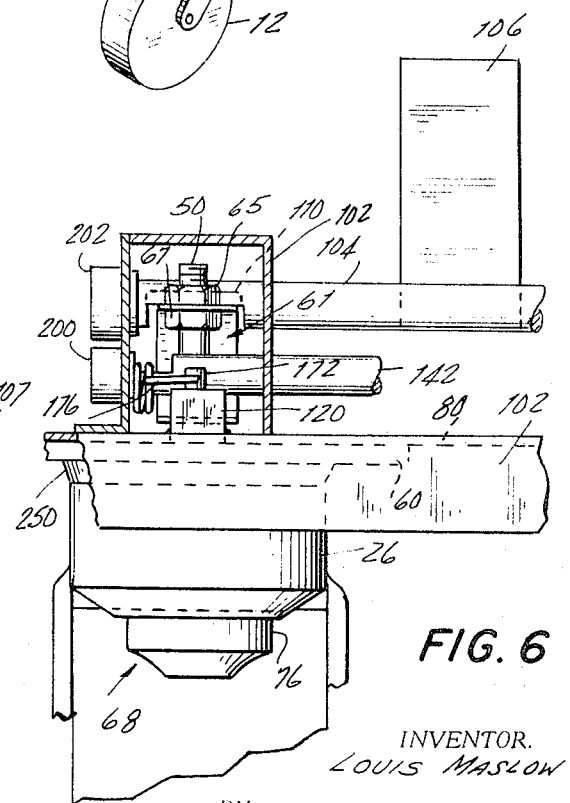
FIGURE 6 is an end view partially broken away of the caster assembly of my invention.

A preferred embodiment of my caster assembly is illustrated in the drawings in which the caster assembly 10 comprises a caster wheel 12 provided with caster wheel arms 14 and 16 provided at the end with pin holes through which is passed a headed pin 22 (head not shown) when the hole in caster wheel 12 (not shown) is in registry with the pin holes. Pin 22 is threaded on the opposite side to engage a nut 24 so as to fix wheel 12 in position for rotation as shown in FIGURE 6. Arms 14 and 16 are secured to rotatable mount 26 which slopes downwardly and inwardly and is provided with a vertical hole 36 therethrough. Adjacent the hole 36 and abutting it are indented spaces 38 and 40 which are so sized to receive bearing members 42 and 44. Each bearing member 42 and 44 is in two parts, one of which is in rotatable mount 26 and the other of which is a bearing part of the member passing through rotatable mount 26. The portion of the bearings which are rotatable are designated by reference numerals 42′ and 44′ as seen in FIGURES 2, 4 and 5.

Figure 3:
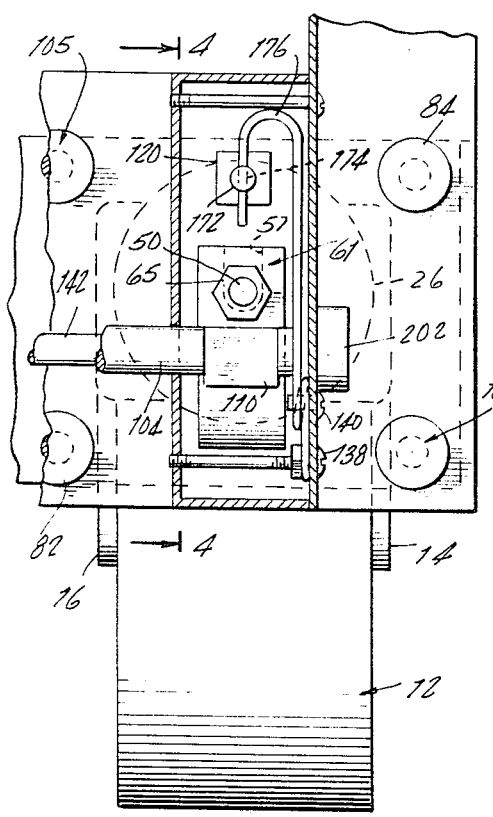
FIGURE 3 is a sectional elevation of the caster assembly provided with the brake mechanism of my invention, which section is taken along line 3—3 of FIGURE 1.

Passing through vertical hole 36 and in abutting relationship with bearings 42 and 44 is ring 48 resting on bearing half 42′. Through ring 48 passes circular pin 50 provided with a vertical hole 52 therethrough adaptable to receive upwardly extending vertical brake support 54 in rotatable relationship therewith provided with extension piece 55. Brake support 54 is threaded at its upper end, passes within U-shaped cut-out 57 of the lower leg 59 of U-shaped leaf spring member 61, and through a hole in upper leg 63 of U-shaped leaf spring member 61. The threads are engaged by nut 65 overlying the upper leg 63. The lower end of pin 50 is threaded and is secured in a threaded nut 64 or similar reciprocally threaded means. Circular pin 50 is provided with an outwardly sloping flange 56 which is of such proportions that it fits into a reciprocally beveled hole 58 in plate 60. Plate 60 is secured to stationary support 80 by virtue of screws 82 and 84 passing through holes 86 and 88 of plate 60, and holes 90 and 92 of stationary support 80 when the latter are in registry with holes 86 and 88, said screws being held firmly in place using nuts 94 and 96 respectively engaging the screws and underlying plate 60 and washers 97 and 99. Another set of diagonally opposite screws, washers, and nuts 105 and 107 are also employed as seen in FIGURE 3.

Thus, rotatable mount 26 is rotatable with respect to pin 50, ring 48, nut 64, bearing halves 42′ and 44′, enabling swivel of caster wheel 12, facilitating turning and the like.

Passing through vertical hole 52 of pin 50 is the vertical brake support in rotatable relationship with said pin. The brake support has affixed thereto at its lower extremity braking element 68 comprising an inwardly curved edge 70, the arc of which is the same as the arc of the caster wheel 12; and thus when the two are in frictional engagement, braking action results. A ring 71 sits inside braking element 68 and surrounds vertical brake support 54. Braking element 68 is provided with vertically upwardly extending lip 74 slidable against an internal wall of rotatable mount 26, so that a large proportion of the braking element 68 can be housed within rotatable mount 26. Hence, the braking element itself does not embody any protruding elements or devices adjacent the caster wheel 12 itself, but instead is largely housed in a mount in which also is housed means about which the caster wheel 12 with its arms 14 and 16 is rotatable.

Figure 1:
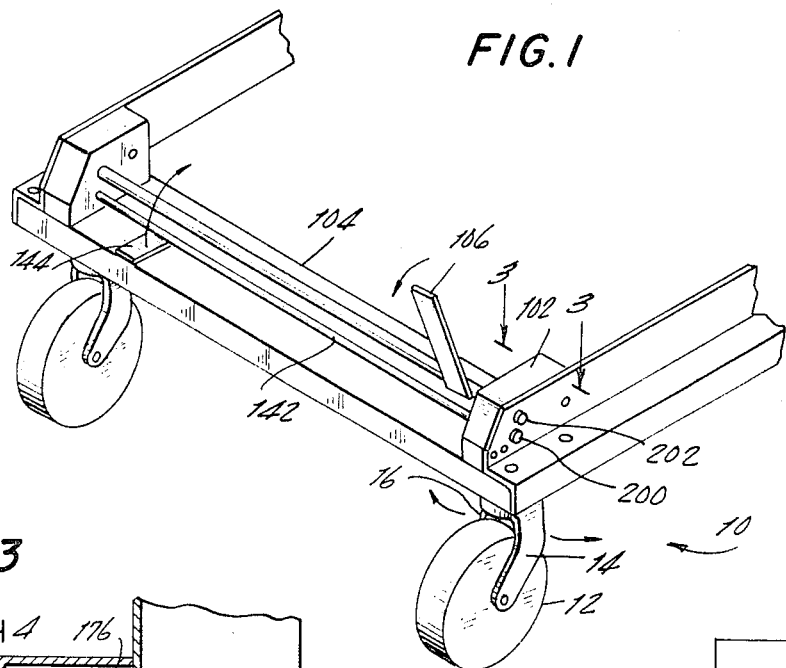
FIGURE 1 is a perspective view of a cart with the caster assembly of my invention in place. The drawing shows the levers which operate the mechanisms, which levers are in a position remote from the caster wheel itself.

Permanently affixed to stationary support 80 is braking element control housing 102 which slopes on the end nearest the operator as shown in FIGURE 1. Passing through housing 102 is rod 104 to which is affixed lever 106. Towards the end of rod 104 is cam means 108 provided with an outwardly extending cam lip 110. This cam means overlies upper leg 63 while lower leg 59 bears against stationary support 80. Rotation of lever 106 causes rod 104 to rotate and this in turn causes or releases pressure against the resilient generally U-shaped leaf spring means 61 due to the action of cam mechanism 108. Pressure on the upper leg 63 causes brake support 54 to travel downward through hole 52 in pin 50 thereby moving braking element 68 against caster wheel 12. Rod 104 passes through housing 102 and out a hole therein. Thus by use of the simple spring mechanism in combination with the cam, the brake can be applied against the wheel 12. If the lever 106 is released, the potential energy in the resilient U-shaped spring will become kinetic forcing the rod 104 to revolve in the opposite direction thereby releasing the braking element 68 from engagement with the caster wheel 12 as vertical brake support 54 rises through hole 52.

Rotatable mount 26 is provided with a plurality of vertically extending locking holes therethrough. Four such locking holes as shown in the accompanying drawings, being designated by reference numerals 164, 166, 168 and 170, which are so proportioned as to receive a swivel pin 172 shown in locking position in FIGURE 4. The pin 172 passes through a hole in stationary support 80 and is partially housed in column 120. It also passes through a hole in plate 60 in registry with the hole in stationary support 80. Pin 172 has a hole 174 running laterally therethrough adaptable to accommodate a resilient wire 176 having a U-shaped end the legs of which lie in the same lateral plane. The wire is twice looped at its opposite end into loops 130 and 132 and held in rigid position by engagement with pins 134 and 136 passing through the side of housing 102 and having heads 138 and 140 on the outside of housing 102. A rod 142 passes through housing 102 and is provided with lever 144 outside the housing. A slot 146 is provided in the generally circular rod 142 near its end within housing 102. The rod at the slot 146 engages resilient wire 176 at about right angles midway between loop 132 and pin 172 imparting cam action due to the irregular surface caused by slot 146. The rod 142 at slot 146 bears upward against the wire. Hence, when the wire passes over the slotted portion no pressure is applied to the wire, but when the rounded surface of rod 142 engages wire 176 upward pressure is exerted sufficient to lift pin 172 out of one of the vertical holes 164, 166, 168 and 170. Hence, revolution of lever 144 causes pressure increase or decrease on resilient movable wire 176 sufficient to lock the caster against swivel or permit swivel by raising pin 172. The positions of the wire 176 relative to pin 172, rod 142 and slot 146 are shown in FIGURES 4 and 5. FIGURE 4 shows the wire passing through the slot so that the rod does not bear against it. The gravity forces enable pin 172 to be in the locking position shown. Pressure against wire 176, as shown in FIGURE 5 causes the pin to rise allowing the rotatable mount 26 and caster wheel 12 to swivel. Rod 142 passes out through the other side of housing 102 as does rod 104 as shown by rod ends 200 and 202. The levers are rotatable in the direction of the arrows shown in FIGURE 1.

Adjacent rotatable mount 26 and in abutting relationship therewith and with plate 60 is a circular neoprene rubber gasket 250 running about rotatable mount 26 to protect the mechanism from intrusion of moisture, dust and/or dirt which may be injurious to the mechanism.

My caster assembly is provided in a preferred embodiment with a pair of coacting nuts 65 and 67 as shown in FIGURES 4 and 5. Nut 65 overlies upper leg 63 while coacting nut 67 underlies it. The nuts are movable up and down vertical brake support 54 by virtue of reciprocal threads on the upper end of brake suport 54. Thus, the tension on the U-shaped resilient leaf spring means can be adjusted in response to the position of the coacting nuts 65 and 67. The tension is greatest when the nuts are low and least when the nuts are positioned at the top of vertical brake support 54.

The brake mechanism is operated very easily. It should be noted that for operation of the brake no special wheel alignment is needed, i.e. the caster wheel 12 does not need to be aligned in a straight direction of travel with the cart on which it is mounted for the brake to exert a braking effect. It can be at an angle due to swivel of the rotatable mount 26 about a longitudinal axis relative to pin 50. Furthermore, it should be noted that the swivel lock can be operated when none of the locking holes 164, 166, 168 or 170 is in alignment. The swivel locking effect will take effect as soon as one of the locking holes becomes aligned in registry with the hole in plate 60 as the mechanism is set for the pin 172 to pass into one of the vertical holes unless there is upward pressure against wire 176 due to rotation of rod 142.

Still another important advantage of my invention resides in the ease in which the caster wheels can be removed. Merely by loosening and removing the nuts holding the screws in place joining stationary support 80 with plate 60, the wheel section together with rotatable mount 26 and brake element 68 is removed. Only the operating levers, rods, cams and spring actuating means remain.

It is readily apparent that I have provided a significantly useful and novel caster assembly provided with braking elements to restrain forward and rearward movement as well as swivel action both of which are responsive to a simple efficient actuating means. The brakes can be operated readily by remotely positioned levers. Hence, my caster assembly does not utilize any dangerous radially projecting parts adjacent the caster wheel near the floor. It is thus useful in schools, hospitals, libraries, factories and other places on carts and other carrying means where safety is desired. The actuating levers and rods can work two or more caster assemblies simultaneously if desired.

I claim:

1. In a caster assembly provided with a caster wheel brake means operable by a caster wheel brake actuating means located remote from the caster wheel, the improvement which comprises a generally U-shaped resilient leaf spring means, the legs of said generally U-shaped means running in a generally horizontal direction, the lowermost leg bearing against a stationary member and the uppermost leg in engagement with a cam mechanism, said generally U-shaped resilient spring means affixed to said caster wheel brake means and operable in combination with said cam mechanism to tngage said brake means on a caster wheel.

2. An improvement according to claim 1 wherein said uppermost leg of said generally U-shaped resilient spring means is affixed to a vertically disposed caster wheel brake support, said support passing through a generally U-shaped opening in said lowermost leg.

3. An improvement according to claim 1 including means for adjusting the tension of said generally U-shaped resilient spring means.

4. An improvement according to claim 3 wherein said means for adjusting tension includes a pair of adjustable coacting nuts one overlying said uppermost leg and one underlying said uppermost leg and adjustable vertically up and down a vertical portion of said caster wheel brake means.

5. In a caster assembly provided with a laterally rotatable means provided with a caster wheel rotatable therewith, said caster wheel rotatable vertically with respect to said laterally rotatable means, said laterally rotatable means provided with a plurality of vertical holes about its periphery adaptable to receive a swival braking pin, a horizontal stationary plate provided with a downwardly extending column about which said laterally rotatable means is rotatable, said horizontal stationary plate provided with at least one hole which when in registry with one of said vertical holes permits passage of said swivel braking pin therethrough and into said vertical hole, thereby locking said laterally rotatable means to said horizontal stationary plate, the improvement which comprises a resilient laterally extending wire one end of which is in engagement with the upper end of said pin and the other end of which is rigidly affixed to said caster assembly, said wire in engagement with a cam mechanism operable to raise and lower said wire thereby raising and lowering said pin.

6. An improvement according to claim 5 wherein said cam mechanism engages said wire at about a right angle.

7. An improvement according to claim 5 wherein the end of said wire in engagement with said pin is at its end in a general U-shaped configuration with the legs of the U in the same general lateral plane.

8. An improvement according to claim 5 wherein said caster assembly is provided with a caster wheel brake means operable by a caster wheel brake actuating means located remote from the caster wheel in which there is a generally U-shaped resilient leaf spring means, the legs of said generally U-shaped means running in a generally horizontal direction, the lowermost leg bearing against a stationary member and the uppermost leg in engagement with a cam mechanism, said generally U-shaped resilient spring means affixed to said caster wheel brake means and operable in combination with said cam mechanism to engage said brake means on a caster wheel.

9. An improvement according to claim 8 wherein said uppermost leg of said generally U-shaped resilient spring means is affixed to a vertically disposed caster wheel brake support, said support passing through a generally U-shaped opening in said lowermost leg.

References Cited

UNITED STATES PATENTS

| 740,267 | 9/1903 | Gamble | 188—69 |
|---|---|---|---|
| 1,731,312 | 10/1929 | Matheson | 16—35 |
| 2,138,433 | 11/1938 | Sunden | 16—35 |
| 2,960,717 | 11/1960 | Moore | 16—35 X |

DONALD A. GRIFFIN, *Primary Examiner.*